United States Patent
Malausa et al.

(10) Patent No.: US 11,293,681 B2
(45) Date of Patent: Apr. 5, 2022

(54) TEMPERATURE-CONTROLLED DRAWER IN A REFRIGERATOR

(71) Applicant: Electrolux Home Products, Inc., Charlotte, NC (US)

(72) Inventors: Andrea Malausa, Veneto (IT); Matteo Simioni, Veneto (IT)

(73) Assignee: Electrolux Home Products, Inc., Charlotte, NC (US)

( * ) Notice: Subject to any disclaimer, the term of this patent is extended or adjusted under 35 U.S.C. 154(b) by 159 days.

(21) Appl. No.: 16/856,484

(22) Filed: Apr. 23, 2020

(65) Prior Publication Data

US 2021/0333036 A1 Oct. 28, 2021

(51) Int. Cl.
| F25D 11/02 | (2006.01) |
| F25D 25/02 | (2006.01) |
| F25D 27/00 | (2006.01) |
| F25D 29/00 | (2006.01) |

(52) U.S. Cl.
CPC ............ *F25D 11/02* (2013.01); *F25D 25/025* (2013.01); *F25D 27/005* (2013.01); *F25D 29/00* (2013.01); *F25D 2400/36* (2013.01); *F25D 2700/121* (2013.01)

(58) Field of Classification Search
CPC .... F25D 11/02; F25D 2400/36; F25D 25/025; F25D 2700/121; F25D 27/005
See application file for complete search history.

(56) References Cited

U.S. PATENT DOCUMENTS

| 6,343,477 | B1 | 2/2002 | Mandal et al. |
| 6,463,752 | B2 | 10/2002 | Mandal et al. |
| 6,880,949 | B2 | 4/2005 | Miozza et al. |
| 8,966,926 | B2 | 3/2015 | Eveland et al. |
| 9,140,486 | B2 * | 9/2015 | Wimbert ................. F25D 27/00 |
| 9,377,578 | B2 * | 6/2016 | Gooden .................. F25D 27/00 |
| 9,534,825 | B2 | 1/2017 | Eveland et al. |
| 9,845,986 | B2 * | 12/2017 | Sankhgond ........... F21V 23/003 |
| 9,927,167 | B2 | 3/2018 | Eveland et al. |
| 10,302,353 | B2 | 5/2019 | Uchida et al. |
| 2014/0145579 | A1 | 5/2014 | Anderson et al. |
| 2017/0191731 | A1 | 7/2017 | Djerekarov et al. |
| 2018/0080702 | A1 | 3/2018 | Wilson |
| 2018/0080703 | A1 | 3/2018 | Wilson |
| 2019/0186816 | A1 | 6/2019 | Hwang et al. |
| 2019/0186817 | A1 | 6/2019 | Hwang et al. |

FOREIGN PATENT DOCUMENTS

| EP | 0849553 A2 | 6/1998 |
| WO | WO2006/011099 A1 | 2/2006 |
| WO | WO2009/099441 A1 | 8/2009 |

* cited by examiner

*Primary Examiner* — Filip Zec

(74) *Attorney, Agent, or Firm* — Pearne & Gordon LLP

(57) ABSTRACT

A refrigerator has a temperature-controlled drawer within a fresh food compartment that includes: a temperature sensor within the temperature-controlled drawer and/or the fresh food compartment; a display coupled to the drawer, wherein the display receives an output from the temperature sensor, determines what food type would be best suited for the temperature based on said temperature sensor output, and indicates what type of food it has determined is best for storage therein; at least one light within said drawer, wherein the at least one light changes to a first color, based on the food type indicated by the display, and turns off and on depending on whether the fresh food compartment door is closed or open, respectively.

20 Claims, 3 Drawing Sheets

TEMPERATURE-CONTROLLED DRAWER IN A REFRIGERATOR

FIELD OF THE INVENTION

The invention is related to a temperature-controlled drawing in a refrigerator.

BACKGROUND OF THE INVENTION

Conventional refrigeration appliances, such as domestic refrigerators, typically have both a fresh food compartment and a freezer compartment or section. The fresh food compartment is where food items, such as fruits, vegetables, and beverages, are stored. The freezer compartment is where food items that are to be kept in a frozen condition are stored. Refrigerators are provided with refrigeration systems that maintains the fresh food compartment at temperatures above 0° C., such as between 0.25° C. and 4.5° C. and the freezer compartments at temperatures below 0° C., such as between 0° C. and −20° C.

The arrangements of the fresh food and freezer compartments with respect to one another in such refrigerators vary. For example, in some cases, the freezer compartment is located above the fresh food compartment and in other cases the freezer compartment is located below the fresh food compartment. Additionally, many modern refrigerators have their freezer compartments and fresh food compartments arranged in a side-by-side relationship. Whatever arrangement of the freezer compartment and the fresh food compartment is employed, typically, separate access doors are provided for the compartments so that either compartment can be accessed without exposing the other compartment to the ambient air.

Typically, a controlled temperature drawer inside the fresh food compartment is used to best preserve different types of food at an optimum temperature. This temperature-controlled drawer may be located in the fresh food (FF) cavity of the refrigerator and may take cold air from the refrigerator or the cooling ducts. Different temperature settings can be provided depending on the items to be stored in the drawer.

The controlled temperature drawer can be used to store deli trays, fresh meat, leftovers, beverages or other food items that, for an optimum storage, require different (e.g., colder) temperatures than what is usually present inside the overall fresh food cavity. Usually, the controlled temperature drawer is not to be used for vegetables.

SUMMARY OF THE INVENTION

A refrigerator has a temperature-controlled drawer within a fresh food compartment that includes: a temperature sensor within the temperature-controlled drawer and/or the fresh food compartment; a display coupled to the drawer, wherein the display receives an output from the temperature sensor, determines what food type would be best suited for the temperature based on said temperature sensor output, and indicates what type of food it has determined is best for storage therein; at least one light within said drawer, wherein the at least one light changes to a first color, based on the food type indicated by the display, and turns off and on depending on whether the fresh food compartment door is closed or open, respectively.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

Figure 1:
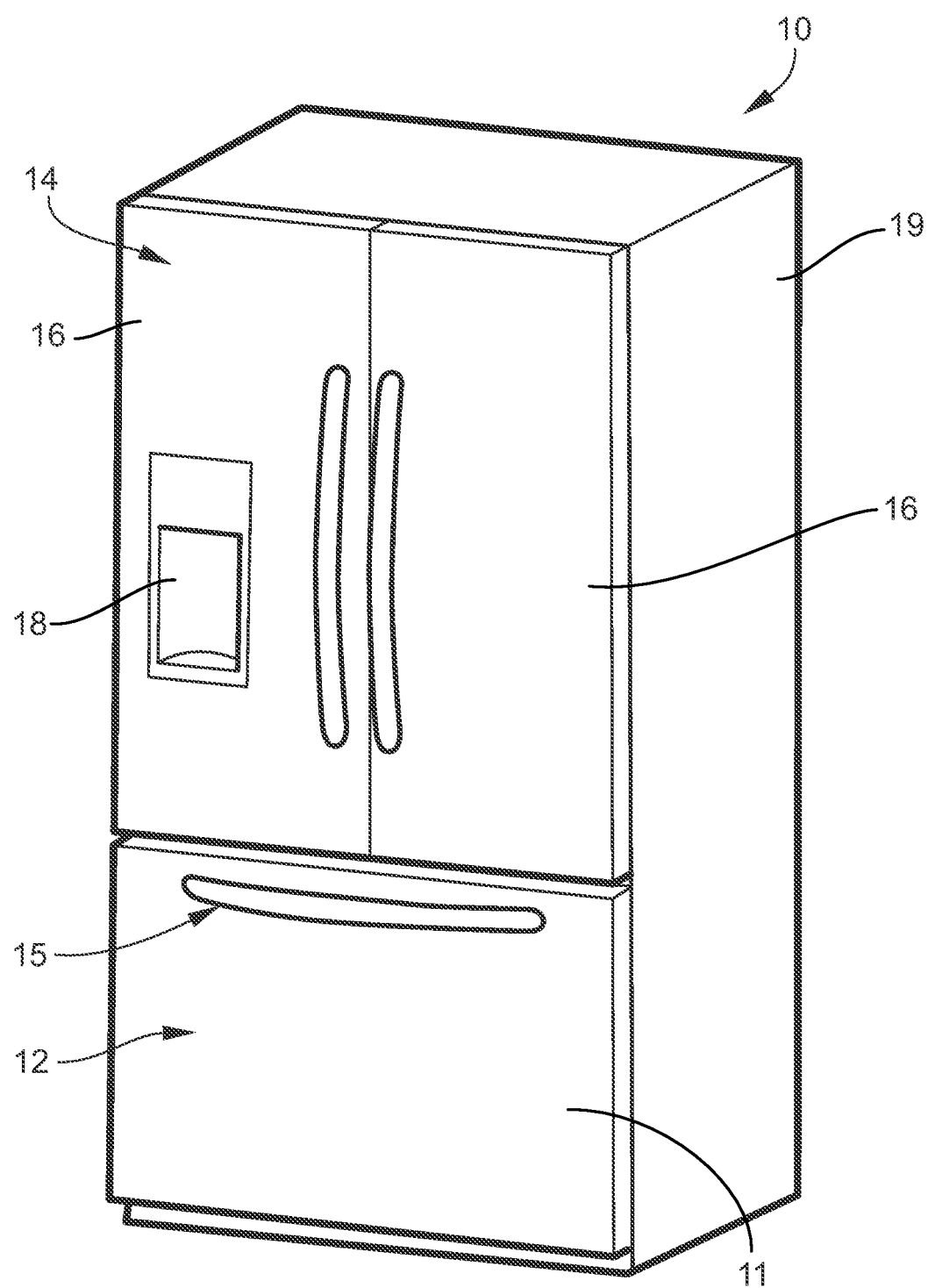
FIG. 1 is a front perspective view of a prior art household French door bottom mount refrigeration appliance showing doors of the fresh food compartment and drawer of a freezer compartment in a closed position.

Referring to the drawings, wherein like elements have like numerals, there is shown in the figures an embodiment, that is currently preferred, of the temperature-controlled drawer 100 for a refrigerator. In general, drawer 100 includes a temperature sensor 120 (located, for example, on an inside surface of the drawer—not shown), a display 14, and a light 16 (located on an inside surface of the drawer—not shown).

Figure 2:
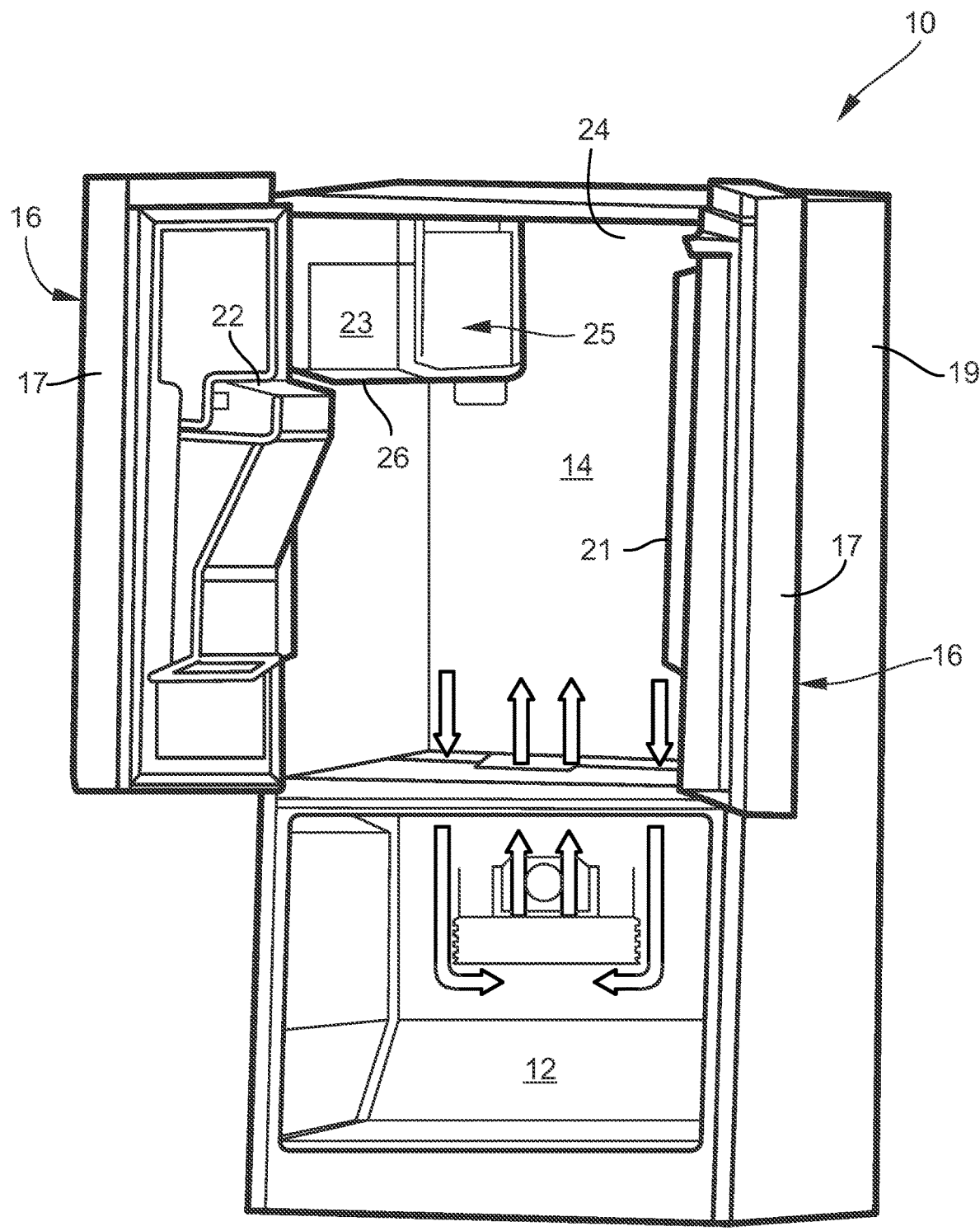
FIG. 2 is a front perspective view of the prior art refrigeration appliance of FIG. 1 showing the doors of the fresh food compartment in opened positions and the drawer of the freezer compartment removed.

Referring now to the drawings, FIGS. 1 and 2 show a refrigeration appliance in the form of a domestic refrigerator, indicated generally at 10. Although the detailed description that follows concerns a domestic refrigerator 10, the invention can be embodied by refrigeration appliances other than a domestic refrigerator 10. An embodiment is described in detail below, and shown in the figures as a bottom-mount configuration of a refrigerator 10, including a fresh food compartment 14 disposed vertically above a freezer compartment 12. However, the refrigerator 10 can have any desired configuration including at least a fresh food compartment 14 and/or a freezer compartment 12, such as a top mount refrigerator (freezer disposed above the fresh food compartment), a side-by-side refrigerator (fresh food compartment is laterally next to the freezer compartment), a standalone refrigerator or freezer, etc.

One or more doors 16 shown in FIG. 1 are pivotably coupled to a cabinet 19 of the refrigerator 10 to restrict and grant access to the fresh food compartment 14. The door 16 can include a single door that spans the entire lateral distance across the entrance to the fresh food compartment 14, or can include a pair of French-type doors 16 as shown in FIG. 1 that collectively span the entire lateral distance of the entrance to the fresh food compartment 14 to enclose the fresh food compartment 14.

For the latter configuration, a center flip mullion 21 (FIG. 2) is pivotally coupled to at least one of the doors 16 to establish a surface against which a seal provided to the other one of the doors 16 can seal the entrance to the fresh food compartment 14 at a location between opposing side surfaces 17 (FIG. 2) of the doors 16. The mullion 21 can be pivotably coupled to the door 16 to pivot between a first orientation that is substantially parallel to a planar surface of the door 16 when the door 16 is closed, and a different orientation when the door 16 is opened. The externally exposed surface of the center mullion 21 is substantially parallel to the door 16 when the center mullion 21 is in the first orientation and forms an angle other than parallel relative to the door 16 when the center mullion 21 is in the second orientation. The seal and the externally exposed surface of the mullion 21 cooperate approximately midway between the lateral sides of the fresh food compartment 14.

A dispenser 18 (FIG. 1) for dispensing at least ice pieces, and optionally water, can be provided on an exterior of one of the doors 16 that restricts access to the fresh food compartment 14. The dispenser 18 includes an actuator (e.g., lever, switch, proximity sensor, etc.) to cause frozen ice pieces to be dispensed from an ice bin 23 (FIG. 2) of an ice maker 25 disposed within the fresh food compartment 14. Ice pieces from the ice bin 23 can exit the ice bin 23 through an aperture 26 and be delivered to the dispenser 18 via an ice chute 22 (FIG. 2), which extends at least partially through the door 16 between the dispenser 18 and the ice bin 23.

The freezer compartment 12 is arranged vertically beneath the fresh food compartment 14. A drawer assembly (not shown) including one or more freezer baskets (not shown) can be withdrawn from the freezer compartment 12 to grant a user access to food items stored in the freezer compartment 12. The drawer assembly can be coupled to a freezer door 11 that includes a handle 15. When a user grasps the handle 15 and pulls the freezer door 11 open, at least one or more of the freezer baskets is caused to be at least partially withdrawn from the freezer compartment 12.

In alternative embodiments, the ice maker is located within the freezer compartment. In this configuration, although still disposed within the freezer compartment, at least the ice maker (and possible an ice bin) is mounted to an interior surface of the freezer door. It is contemplated that the ice mold and ice bin can be separate elements, in which one remains within the freezer compartment and the other is on the freezer door.

The freezer compartment 12 is used to freeze and/or maintain articles of food stored in the freezer compartment 12 in a frozen condition. For this purpose, the freezer compartment 12 is in thermal communication with a freezer evaporator (not shown) that removes thermal energy from the freezer compartment 12 to maintain the temperature therein at a temperature of 0° C. or less during operation of the refrigerator 10, preferably between 0° C. and −50° C., more preferably between 0° C. and −30° C. and even more preferably between 0° C. and −20° C.

The refrigerator 10 includes an interior liner 24 (FIG. 2) that defines the fresh food compartment 14. The fresh food compartment 14 is located in the upper portion of the refrigerator 10 in this example and serves to minimize spoiling of articles of food stored therein. The fresh food compartment 14 accomplishes this aim by maintaining the temperature in the fresh food compartment 14 at a cool temperature that is typically above 0° C., so as not to freeze the articles of food in the fresh food compartment 14. It is contemplated that the cool temperature preferably is between 0° C. and 10° C., more preferably between 0° C. and 5° C. and even more preferably between 0.25° C. and 4.5° C.

According to some embodiments, cool air from which thermal energy has been removed by the freezer evaporator can also be blown into the fresh food compartment 14 to maintain the temperature therein greater than 0° C. preferably between 0° C. and 10° C., more preferably between 0° C. and 5° C. and even more preferably between 0.25° C. and 4.5° C. For alternate embodiments, a separate fresh food evaporator can optionally be dedicated to separately maintaining the temperature within the fresh food compartment 14 independent of the freezer compartment 12.

According to an embodiment, the temperature in the fresh food compartment 14 can be maintained at a cool temperature within a close tolerance of a range between 0° C. and 4.5° C., including any subranges and any individual temperatures falling with that range. For example, other embodiments can optionally maintain the cool temperature within the fresh food compartment 14 within a reasonably close tolerance of a temperature between 0.25° C. and 4° C.

Figure 3:
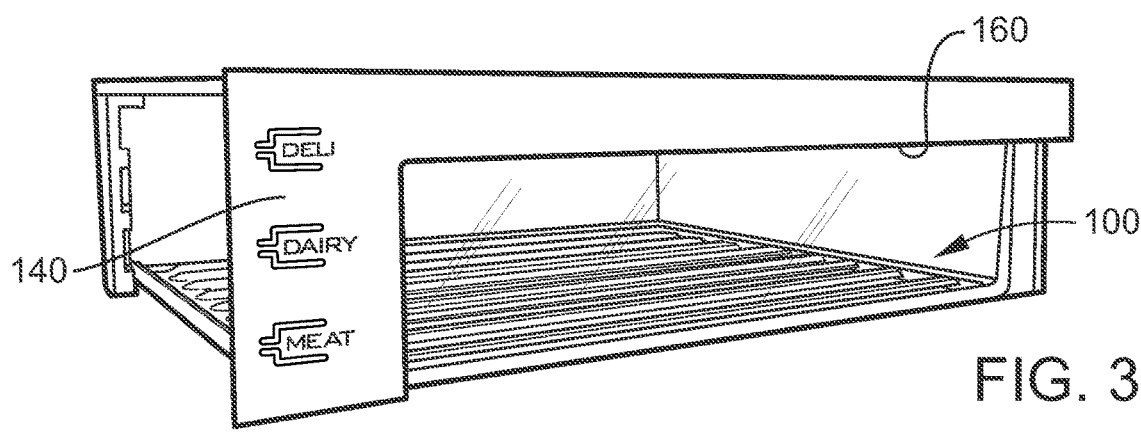
FIG. 3 shows an embodiment of a temperature-controlled drawer.
Figure 4:
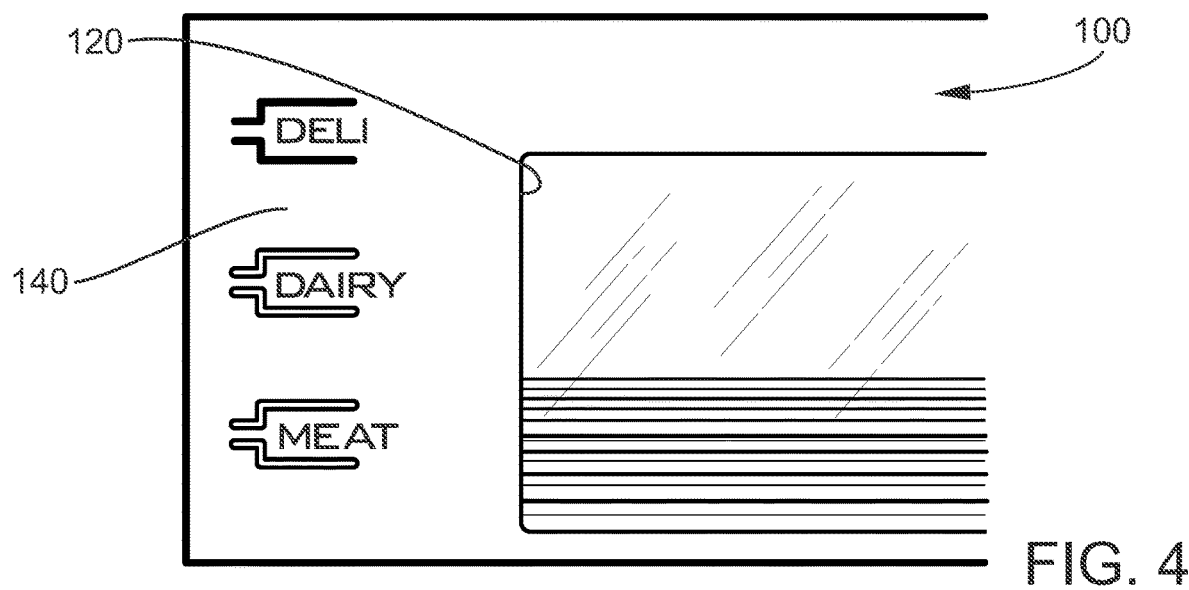
FIG. 4 shows an embodiment of a display of the temperature-controlled drawer.
Figure 5:
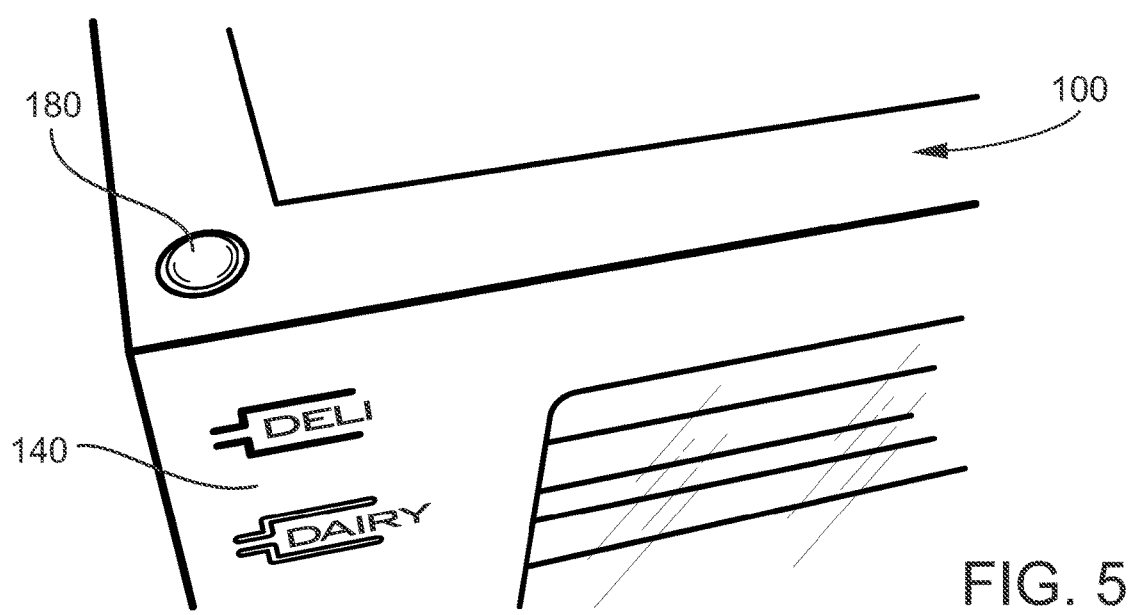
FIG. 5 shows an embodiment of a switch of the temperature-controlled drawer.

Referring now to FIGS. 3, 4, and 5, an embodiment of the temperature-controlled drawer 100, as used herein, refers to, for example, an open container, with or without a lid, slidably mounted within the fresh food compartment 14 of the refrigerator 10. The drawer 10 is operatively connected to refrigerator 10 to take cold air from the refrigerator or the cooling ducts, as is well known. In one embodiment, the drawer may include no temperature dampener (or temperature dampening mechanism associated with the drawer).

Temperature sensor 120 may be any conventional temperature sensor. Sensor 120 may be located within the drawer 100, for example, on an inside surface thereof, and/or located within the fresh food compartment. The temperature of the drawer is controlled primarily by (and/or has a known relationship to) the temperature in the fresh food compartment. The sensor 120 only measures the temperature and is not used to control the temperature within the drawer. Sensor 120 produces an output signal.

Display 140 may be any display. The display 140 may include lights (e.g., LEDs) to illuminate the interior of the drawer and/or a LCD display. The display 140 shows three exemplary temperature ranges: Deli, dairy, or meat (these temperature ranges are well known in the art). The display 140 takes the output signal from the sensor 120 and translates the signal to a temperature (as is well known) and displays that temperature by, as shown, activating a light within the drawer and/or on the display. The temperature indicated is the best temperature for the food-type indicated on the display to be stored within the drawer. The display may operate as follows: the display receives an output from the temperature sensor, determines what food type would be best suited for the temperature within said drawer based on said temperature sensor output, and indicates what type of food it has determined is best for storage therein.

Light 160 may be any light. In one embodiment the light is a LED. The LED may one that emits different colors, based on input (e.g., voltage), as is well known. In one embodiment, the wavelength of the light is chosen based on the temperature, it being understood that some light wavelengths may have properties beneficial to the temperature range, e.g., better bacteria destroying properties for a given temperature range of product stored at that temperature range. The light 16 may be located within the drawer 100. The light may be place on an interior surface of the drawer and/or may be an exterior surface or part of the drawer. The light is operatively coupled to the display, so that the color on the display and the color of the light match. Additionally, the light is activated when the drawer is open and is extinguished when the drawer is closed, as is well known.

Switch 180 may be used to change the temperature within the drawer 100. Switch 180 is operatively connected to the cold air generator of the refrigerator (not shown), as is well known. When the switch 180 is engaged the temperature within the drawer 10 indexes through the preset temperature ranges of the food-type indicated.

The present invention may be embodied in other forms without departing from the spirit and the essential attributes thereof, and, accordingly, reference should be made to the appended claims, rather than to the foregoing specification, as indicating the scope of the invention.

We claim:

1. A refrigerator comprises
a temperature-controlled drawer within a fresh food compartment including:
- a temperature sensor within the temperature-controlled drawer and/or the fresh food compartment;
- a display coupled to the drawer, wherein the display receives an output from the temperature sensor,
- determines what food type would be best suited for the temperature based on said temperature sensor output, and
- indicates what type of food it has determined is best for storage therein;
  - at least one light within said drawer, wherein the at least one light changes to a first color, based on the food type indicated by the display, and turns off and on depending on whether the fresh food compartment door is closed or open, respectively.

2. The refrigerator of claim 1 further comprising:
a switch for changing the temperature within said drawer.

3. The refrigerator of claim 1 wherein the temperature sensor does not affect or control the temperature of the drawer.

4. The refrigerator of claim 1 wherein the drawer has no temperature damper.

5. The refrigerator of claim 1 wherein the display is a LED display or an LCP display.

6. The refrigerator of claim 5 wherein the display is a LED display.

7. The refrigerator of claim 1 wherein the at least one light is a LED light.

8. The refrigerator of claim 7 wherein the LED light is displays various colors based on input to the LED light.

9. The refrigerator of claim 1 wherein the first color matches a color on the display.

10. The refrigerator of claim 1 wherein the temperature-controlled drawer within a fresh food compartment of includes:
- a temperature sensor does not affect or control the temperature of the drawer;
- a LED display coupled to the drawer, wherein the display receives an output from the temperature sensor,
- determines what food type would be best suited for the temperature within said drawer based on said temperature sensor output, and
- indicates what type of food it has determined is best for storage therein with a first color;
- at least one LED light within said drawer, wherein the at least one light changes to a second color, based on the food type indicated by the display, the first color and the second color match, and turns off and on depending on whether the fresh food compartment door is closed or open, respectively.

11. A temperature-controlled drawer within a fresh food compartment of a refrigerator comprising:
- a temperature sensor within the temperature-controlled drawer and/or the fresh food compartment;
- a display coupled to the drawer, wherein the display receives an output from the temperature sensor,
- determines what food type would be best suited for the temperature based on said temperature sensor output, and
- indicates what type of food it has determined is best for storage therein;
- at least one light within said drawer, wherein the at least one light changes to a first color, based on the food type indicated by the display, and turns off and on depending on whether the fresh food compartment door is closed or open, respectively.

12. The temperature-controlled drawer of claim 11 further comprising:
a switch for changing the temperature within said drawer.

13. The temperature-controlled drawer of claim 11 wherein the temperature sensor does not affect or control the temperature of the drawer.

14. The temperature-controlled drawer of claim 11 wherein the drawer has no temperature damper.

15. The temperature-controlled drawer of claim 11 wherein the display is a LED display or an LCP display.

16. The temperature-controlled drawer of claim 15 wherein the display is a LED display.

17. The temperature-controlled drawer of claim 11 wherein the at least one light is a LED light.

18. The temperature-controlled drawer of claim 17 wherein the LED light is displays various colors based on input to the LED light.

19. The temperature-controlled drawer of claim 11 wherein the first color matches a color on the display.

20. The temperature-controlled drawer of claim 11 wherein the temperature-controlled drawer includes:
- a temperature sensor does not affect or control the temperature of the drawer;
- a LED display coupled to the drawer, wherein the display receives an output from the temperature sensor,
- determines what food type would be best suited for the temperature within said drawer based on said temperature sensor output, and
- indicates what type of food it has determined is best for storage therein with a first color;
- at least one LED light within said drawer, wherein the at least one light changes to a second color, based on the food type indicated by the display, the first color and the second color match, and turns off and on depending on whether the fresh food compartment door is closed or open, respectively.

* * * * *